United States Patent
Kim et al.

(10) Patent No.: US 6,765,365 B2
(45) Date of Patent: Jul. 20, 2004

(54) EXTERNAL BATTERY PACK APPARATUS

(75) Inventors: Hyun-Jun Kim, Daejeon (KR); Dae-Young Youn, Daejeon (KR)

(73) Assignee: Smart Power Solutions, Inc. (KR)

( * ) Notice: Subject to any disclaimer, the term of this patent is extended or adjusted under 35 U.S.C. 154(b) by 0 days.

(21) Appl. No.: 10/301,434

(22) Filed: Nov. 21, 2002

(65) Prior Publication Data

US 2003/0122523 A1 Jul. 3, 2003

(30) Foreign Application Priority Data

Dec. 28, 2001 (KR) .................................... 2001-40676 U (51) Int. Cl.$^7$ ................................................. H02J 7/00
(52) U.S. Cl. ...................... 320/112; 320/106; 320/128; 320/137
(58) Field of Search ................................ 320/112, 106, 320/114, 107, 111, 113; 429/96, 97, 98

(56) References Cited

U.S. PATENT DOCUMENTS 5,200,685 A * 4/1993 Sakamoto .................... 320/103
5,870,615 A * 2/1999 Bar-On et al. .............. 713/310

* cited by examiner

Primary Examiner—Lawrence Luk
(74) Attorney, Agent, or Firm—Cantor Colburn LLP (57) ABSTRACT

An external battery pack apparatus is provided for supplying to a power-supply voltage to a portable appliance, including an adapter having a power-supply terminal and output voltage setting terminals for programming an output voltage; a cable connected to the adapter; and a main body including a battery, a charging controller for charging the battery, and an output controller for performing a DC-to-DC conversion on a voltage charged in the battery, outputting the DC-to-DC converted voltage to the adapter via the cable, detecting a programming status of the adapter, and changing an output voltage in response to the detected programming status.

8 Claims, 6 Drawing Sheets

EXTERNAL BATTERY PACK APPARATUS

BACKGROUND OF THE INVENTION

1. Field of the Invention

The present invention relates to a battery pack apparatus, and more particularly to an external battery pack apparatus additionally mounted to a portable appliance having an internal battery.

2. Description of the Related Art

Typically, an external dummy pack manufactured by Electro Fuel Company has been widely used to increase a usable time of a portable appliance while a user carries the portable appliance. Such an external dummy pack adopts one of various kinds of adapters on the basis of a connector type of a portable appliance, so that an appropriate adapter based on a connector form of the portable appliance is selectively mounted to the external battery back. A power-supply voltage is applied to the portable appliance via the adapter.

However, a voltage or a current to be applied to the portable appliance may be different among respective portable appliances, but the above conventional external dummy pack has no solution for this problem.

A representative example for varying such a voltage and current is described in U.S. Pat. No. 6,091,611. The technique shown in this patent connects resistant elements between two cable conductors inside of a connector of a cable terminal, and a power-supply unit varies an output voltage and an output current by detecting resistance values of the resistant elements at its own output terminal.

However, such a technique has a disadvantage in that a size of the connector becomes greater because resistant elements should be contained in the connector. Also, since a PWM (Pulse Width Modulation) IC is directly or indirectly controlled according to a resistance value of a connector, electrical signal attenuation is generated by a length of a cable, resulting in deterioration of system reliability.

In the meantime, such an external battery pack apparatus has a disadvantage in that it cannot effectively use a smart communication function supported by a conventional internal battery pack apparatus. This smart communication function means a specific function for providing a portable appliance of which a battery serves as a host with either a variety of information, i.e., an effective lifetime of a battery, the number of charging/discharging operations of the battery, and a current charged state or a usable time of the battery, or basic information for computing the information.

SUMMARY OF THE INVENTION

Therefore, the present invention has been made in view of the above problems, and provides an external battery pack apparatus having simplified connector and cable to supply an output power to a portable appliance.

The present invention provides an external battery pack apparatus for reliably programming an output power.

Further, the present invention provides an external battery pack apparatus having a smart communication function for a portable appliance to recognize status information of a battery.

In accordance with the present invention, an external battery pack apparatus for providing a portable appliance with a power-supply voltage, comprises: an adapter for comprising a power-supply terminal and output voltage setting terminals, and programming an output voltage by short-circuiting or open-circuiting at least one among the terminals; a cable connected to the adapter; and a main body comprising a battery, a charging controller for charging the battery, and an output controller for performing a DC-to-DC conversion on a voltage charged in the battery and outputting the DC-to-DC converted voltage to the adapter via the cable, detecting a programming status of the adapter, and varying an output voltage in response to the detected programming status.

Preferably, the output controller may include an adapter detector for generating different resistance values in response to a programming status of terminals of the adapter, and a DC/DC converter for converting an output DC voltage according to a signal value of an output signal of the adapter detector.

Preferably, the external battery pack apparatus further includes a central controller for checking a charging/discharging state of the battery by controlling the charging controller, and a communication port connected to the central controller, for transmitting the charging/discharging state information of the battery to a portable appliance.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Figure 1:
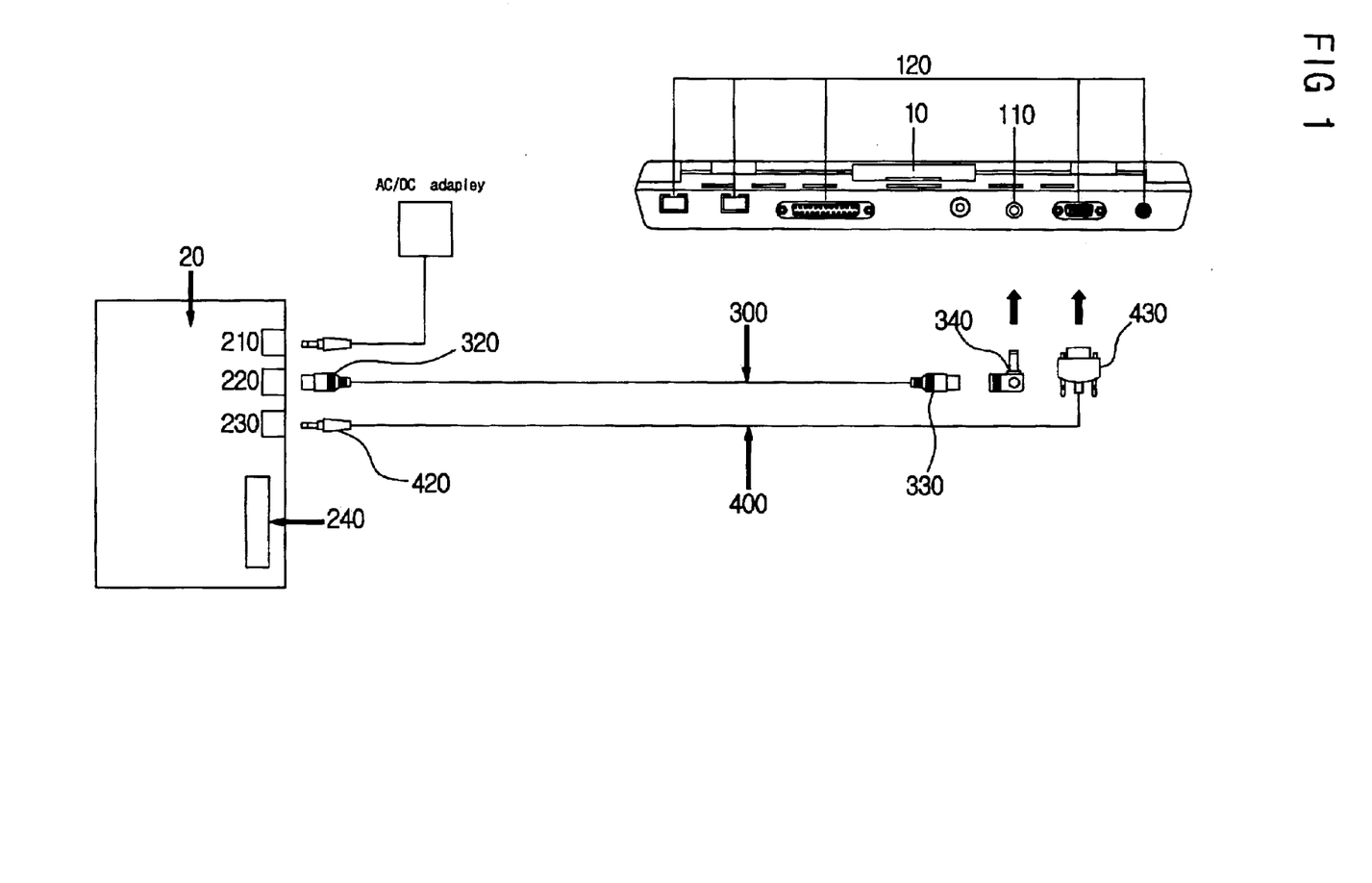
FIG. 1 is a view illustrating a coupling status between an external battery pack apparatus and a portable appliance in accordance with a preferred embodiment of the present invention.

FIG. 1 is a view illustrating a coupling status between an external battery pack apparatus 20 and a portable appliance 10 in accordance with a preferred embodiment of the present invention. The horizontal and vertical sizes of the external battery pack apparatus 20 are similar to those of a notebook computer serving as a subject portable appliance 10. The external battery pack apparatus 20 is shaped as a thin flat panel having a thickness of about 1 cm.

Referring to FIG. 1, an external battery pack apparatus 20 is connected to a power line 300 to provide a power input port 110 of a portable appliance 10 with a DC power. The power line 300 includes a connector 320 connected to a power output port 220 toward an external battery pack 20, a cable, a connector 330 connected to a portable appliance, and an adapter 340 detachably connected to the connector 330. In accordance with a preferred embodiment of the present invention, the adapter 340 is properly selected among various kinds of adapters having different shapes according to a shape of the power input port 110 of a subject portable appliance. So, an output voltage is automatically adjusted to a voltage appropriate for the subject portable appliance on condition that an appropriate adapter is selected and connected to the power line 300.

The external battery pack apparatus 20 contains a communication port 230 communicated with one of a plurality of communication ports 120 of a portable appliance 10, and communicates with the portable appliance 10 via a communication line 400 having an adapter 430 connected to the portable appliance 10. The communication port 230 for exchanging information with the external battery pack apparatus 20 may be a wired serial communication port, for example, a RS-232C and a USB, but it may be one of a dedicated communication connector terminal and a communication port such as an IR-da infrared communication, an RF radio communication, and a wireless LAN in accordance with the present invention. The external battery pack apparatus 20 provides the portable appliance 10 with battery information such as a usable time of the battery, a charging/discharging status, and the number of charging/discharging operations, etc. The portable appliance 10 can provide a user with various kinds of functions, such as a remaining time display function, a battery change time notification function, a battery information guide function, and a used time notification function, etc., using the battery information.

In accordance with a preferred embodiment of the present invention, a communication line 400 is connected at its one end to a connector 420 to be detachably connected with a battery pack main body 20 for a user's convenience in carrying the portable appliance 10, but this configuration is not always needed in the present invention; that is, the communication line 400 may be fixedly connected to the battery pack main body 20.

In addition, the external battery pack apparatus 20 includes a power input port 210 for receiving AC or DC power for a charging operation, and a display 240 for displaying information such as a charging/discharging status of a battery thereon.

Figure 2:
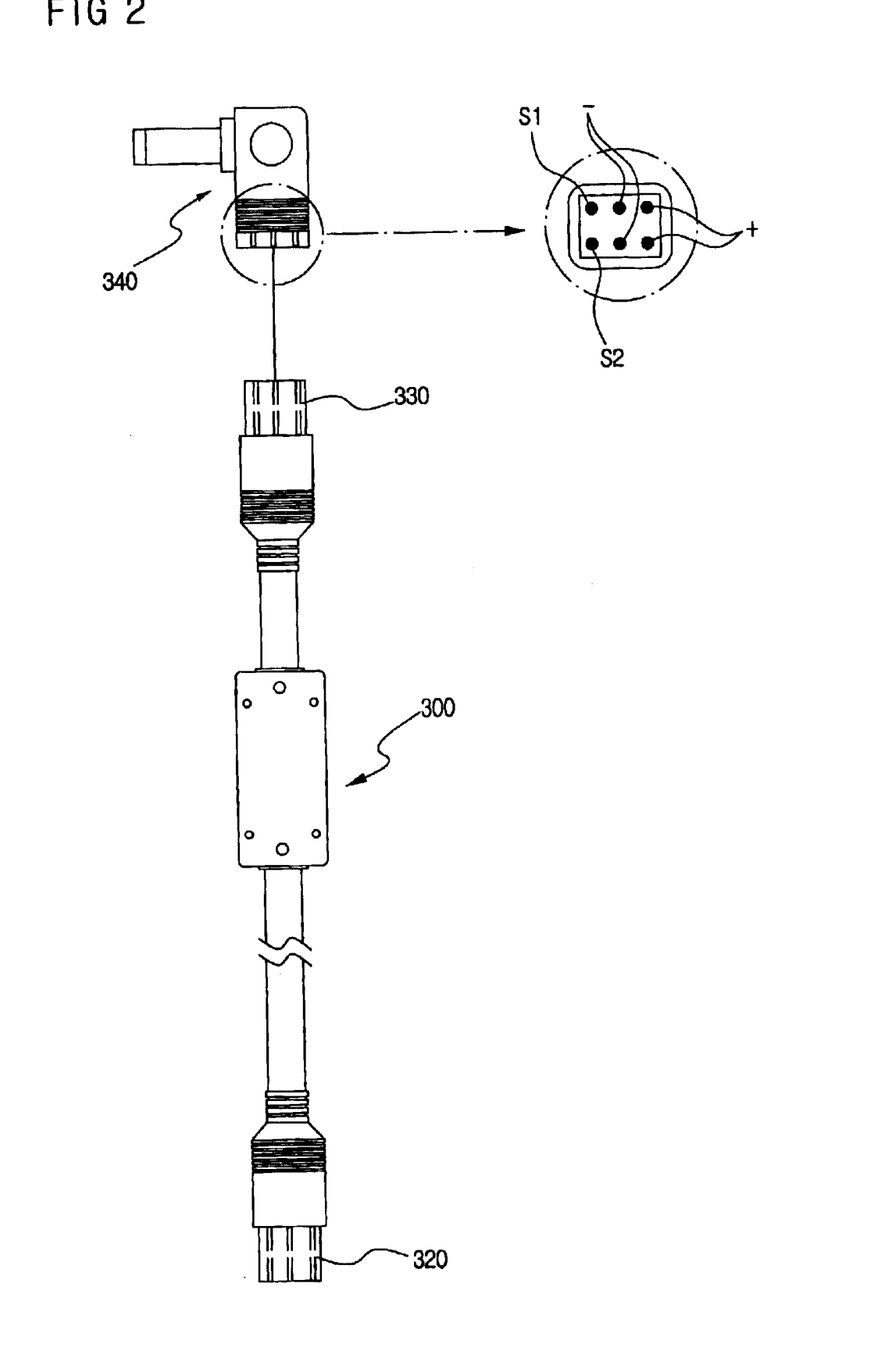
FIG. 2 is an exterior view of a power line layout in accordance with a preferred embodiment of the present invention.

FIG. 2 is an exterior view of a power line 300 in accordance with a preferred embodiment of the present invention. Referring to FIG. 2, connectors 320 and 330 are mounted to both ends of the power line 300, and an adapter 340 is detachably connected to the connector 330. The adapter 340 includes power supply terminals (i.e., positive and negative terminals (+, −)) for generating a power-supply voltage, and output voltage setting terminals S1 and S2. In accordance with a preferred embodiment of the present invention, the connector 330 is connected to the adapter 340 via a six-pin connector, and each of the connector 330 and the adapter 340 is composed of two positive terminals (+), two negative terminals (−), and two output voltage setting terminals S1 and S2. In brief, each of the connector 330 and the adaptor 340 has six pinholes. The power line 330 contains a plurality of signal lines and power lines connected to the above six pinholes. Herein, the signal lines and the power lines are made in different colors to be easily discriminated from each other. It is desirable that an adapter identification mark is attached on one side of the adapter 340 to enable a user to easily select an appropriate adapter according to a type of a portable appliance. This identification mark is a color code composed of color bars discriminated in different colors. One of colors is determined according to each setting state of output voltage setting terminals S1 and S2 of the adapter 340.

A voltage output terminal is set to one of three states, i.e., an open circuit, a connection (L) with a negative terminal(−), and a connection (H) with a positive terminal(+). A number $3^N$ setting states can be provided with respect to the number N of terminals. In a preferred embodiment of the present invention, it is possible to provide nine setting states using two output voltage setting terminals S1 and S2. Four combinations among the nine setting states are adapted to select four output voltages in the present invention. Such setting states are shown in different colors as shown in the following Table 1.

TABLE 1

| S1 | S2 | Color | Output voltage |
|---|---|---|---|
| 0 | 0 | Black | 20 Volt |
| L | 0 | Yellow | 16 Volt |
| 0 | L | Red | 24 Volt |
| L | L | Brown | 12 Volt |

Accordingly, a necessary voltage can be automatically selected and applied to all kinds of electronic appliances on condition that a user selects an appropriate adapter, increasing a user's convenience of use. In addition, an external battery pack apparatus is commonly manufactured regardless of a type of a portable appliance, but it is necessary for only its adapter to be differently applied to the external battery pack apparatus, resulting in an economic advantage and increased practical use.

Figure 3:
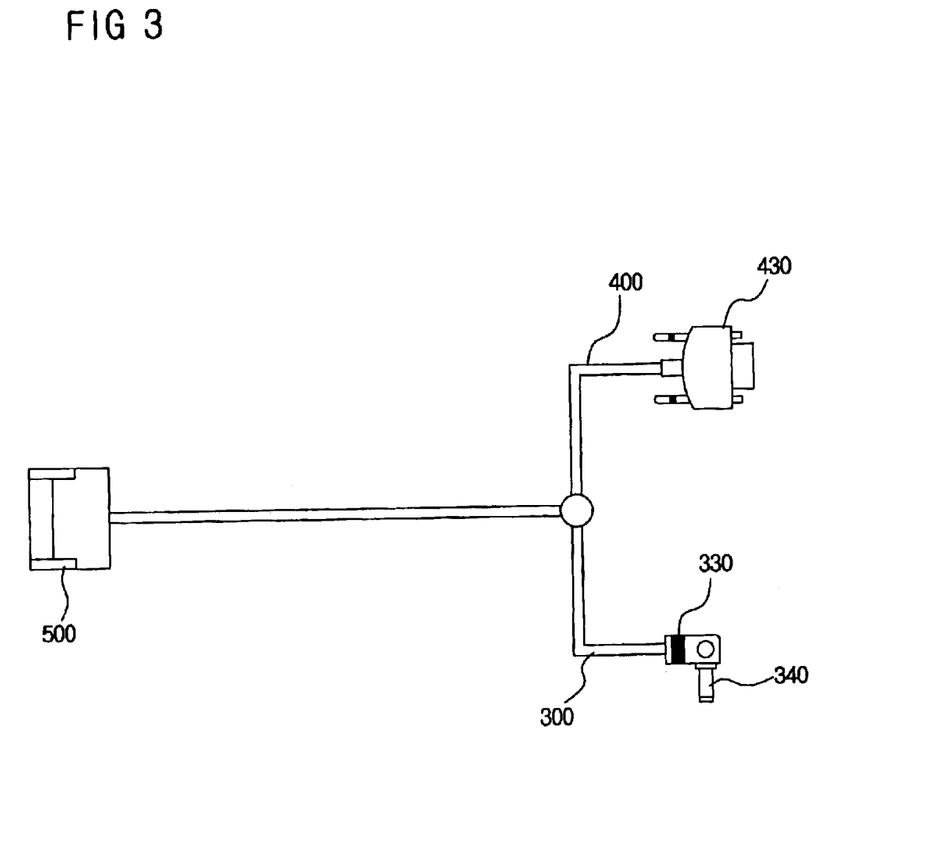
FIG. 3 depicts a configuration of a power line and a communication line in accordance with a preferred embodiment of the present invention.

FIG. 3 depicts a configuration of a power line 300 and a communication line 400 in accordance with a preferred embodiment of the present invention. As shown in FIG. 3, there is a cable having an integrated connector 500 where a power-side connector and a communication-side connector are integrated as one body. An external battery pack apparatus of the integrated connector 500 includes two positive terminals(+), two negative terminals(−), two output voltage setting terminals for selecting a variable voltage according to a type of a portable appliance, a single transmission/reception pin for smart communication, and a S/G pin. The external battery pack apparatus contains eight pins in total. A power connector 330 and a communication connector 430 coupled with a portable appliance 10 are separated from each other at the other side of the external battery pack apparatus, and the aforesaid adapter 340 is detachably connected to the power connector 330.

Figure 4:
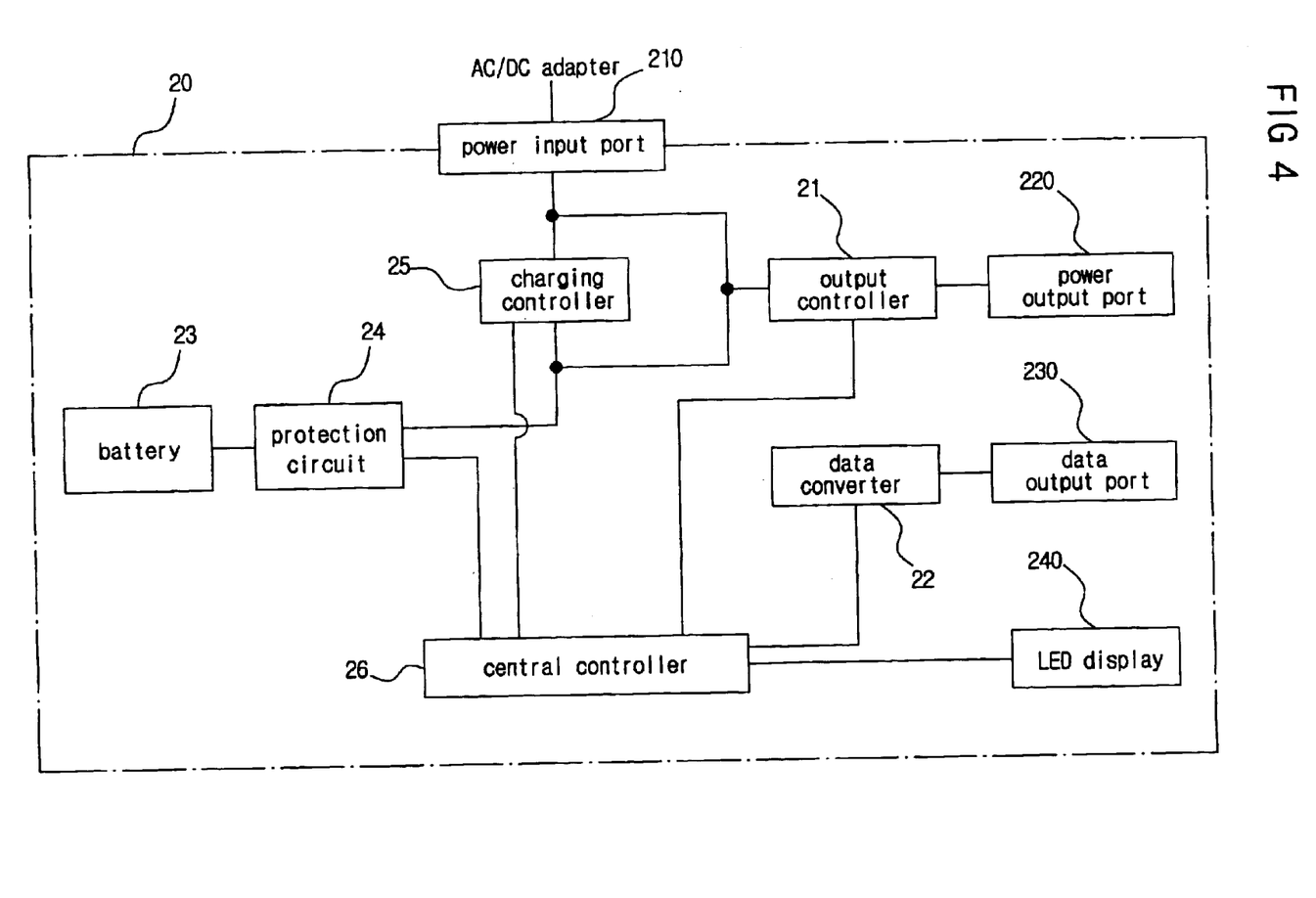
FIG. 4 is a view illustrating a block diagram of an external battery pack apparatus in accordance with a preferred embodiment of the present invention.

FIG. 4 is a view illustrating a block diagram of an external battery pack apparatus in accordance with a preferred embodiment of the present invention. Referring to FIG. 4, an external battery pack apparatus includes a common battery 23, a protection circuit 24, and a charging controller 25. The battery 23 interconnects in series two or four battery cells adapting a lithium(Li)-ion or lithium(Li)-polymer cell as a unit cell, and connects the battery cells in the form of two or three parallel connections, thereby making nSXmP configuration, where n=2~4 and m=2~3. The protection circuit 24 prevents the battery 23 from being damaged by an overvoltage inflow, and may include another circuit for preventing a battery damage caused by a complete discharging of the battery 23. Such configuration of the protection circuit 24 is well known in a common battery pack structure. The charging controller 25 performs a constant-voltage or constant-current process on input power to charge the battery 23. If a terminal voltage of the battery 23 is a high value, the charging controller 25 stops charging. If a terminal voltage of the battery 23 is a low value, the charging controller 25 starts charging. This operation is made by an electrical characteristic without using an additional circuit. In accordance with another preferred embodiment of the present invention, the charging controller 25 may further include a switch, which is switched by a control signal from a central controller 26 and charges the battery 23 by receiving power from a power input port 210, besides a constant-voltage/constant-current circuit.

An external battery pack apparatus 20 in accordance with a preferred embodiment of the present invention includes a central controller 26 and an output controller 21. The central controller 26 includes an A/D converter for detecting an output voltage being an analog signal to check a status of the battery 23, and a non-volatile memory for storing unique information of the battery 23. The central controller 26 is implemented with a one-chip microprocessor where a flash memory is embedded in a single semiconductor chip. The output controller 21 converts a DC voltage of the battery 23 into a DC voltage proper to a subject portable appliance, that is, performs a DC-to-DC conversion, the detailed description thereof to be described in detail later.

An external battery pack apparatus 20 in accordance with a preferred embodiment of the present invention is controlled by a central controller 26. The central controller 26 includes a data converter 22 and a data output port 230 for enabling data stored in a flash memory or start communication information obtained from the battery 23 to communicate with an external portable appliance. The data converter 22 converts data generated from the central controller 26 into a protocol of a data output port 230. An LED (light-emitting diode) display 240 indicates information such as charging or discharging state of the battery 23.

Figure 5:
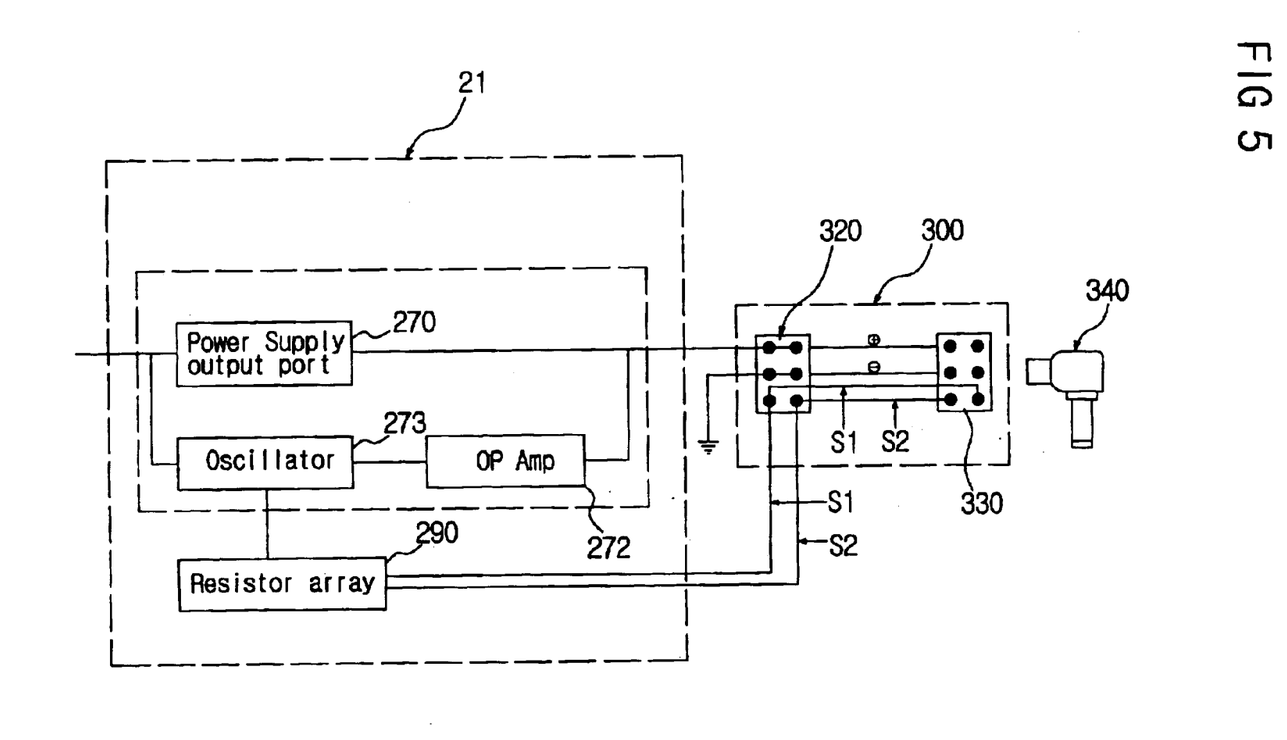
FIG. 5 is a schematic view illustrating a power-supply output terminal having an output controller, a cable and an adapter in accordance with a preferred embodiment of the present invention.

FIG. 5 is a schematic view illustrating a power-supply output terminal having an output controller 21, a cable 300 and an adapter 340 in accordance with a preferred embodiment of the present invention. As shown in FIG. 5, a power-supply output terminal in accordance with a preferred embodiment of the present invention contains a power supply terminal and two output voltage setting terminals S1 and S2. Also, the power-supply output terminal further includes an adapter 340 for programming an output voltage by short-circuiting or open-circuiting at least one pair among the above terminals, a cable 300 connected to the adapter 340, and an output controller 21 for performing a DC-to-DC conversion on a voltage charged in the battery 23 and outputting the DC-to-DC converted voltage to the adapter 340 via the cable 300. The output controller 21 detects a programming status of the adapter 340, and varies an output voltage in response to the detected programming status. In accordance with a preferred embodiment of the present invention, the output controller 21 includes an adapter detector composed of a resistor array 290 generating different resistance values in response to a programming status of terminals of the adapter 340, and a DC/DC converter 270 for converting an output DC voltage in response to a signal value of an output signal of the adapter detector. But, the present invention is not limited to this scope, and may configure the resistor array 290 to generate different voltage values according to an interconnection status of voltage setting terminals S1 and S2 inside of the adapter 340, and enables an output voltage to be varied in response to the voltage value generated from the resistor array 290. Further, the present invention generates different capacity values according to an interconnection status of voltage setting terminals inside of the adapter.

The DC/DC converter 270 is a PWM-based DC-DC converter for converting an input DC voltage to an output DC voltage. In a preferred embodiment of the present invention, an output DC voltage is controlled by a resistance value loaded on a resistor array 290 connected to an oscillator 273. An oscillation frequency of the oscillator 273 directly affects an output DC voltage level, and a DC/DC conversion circuit adapting such a switching method is well known to those skilled in the art. But, a parameter used for controlling an oscillation frequency of the oscillator 273 is not limited to a resistance value proposed in the present invention, and is controlled by a voltage value and a capacity value as previously stated above.

Operations of the DC/DC converter 270 will hereinafter be described below. A voltage provided from a power input port 210 or a battery 23 is applied to an electronic appliance via a driving power-supply output part 271. In this case, an operational amplifier (OP-amp) 272 feeds back an output voltage generated from the driving power-supply output part 271, and compares the feedback output voltage with a reference voltage. If the output voltage of the driving power-supply output part 271 is less than a reference voltage, the OP-amp 272 outputs a driving signal to an oscillator 273 driving the driving power-supply output part 271. The oscillator 273 outputs a driving control signal for driving the driving power-supply output part 271 according to a driving signal of the OP-amp 272 to the driving power-supply output part 271.

In the meantime, the DC/DC converter 270 receives a driving voltage selection value according to a connection status of output voltage setting terminals contained in the adapter 340, selects a resistor value of a resistor array 290 according to the selected driving voltage selection value, outputs a signal to the oscillator 273, thereby providing a driving DC voltage appropriate to a use voltage (i.e., operation voltage) of an electronic appliance.

Figure 6:
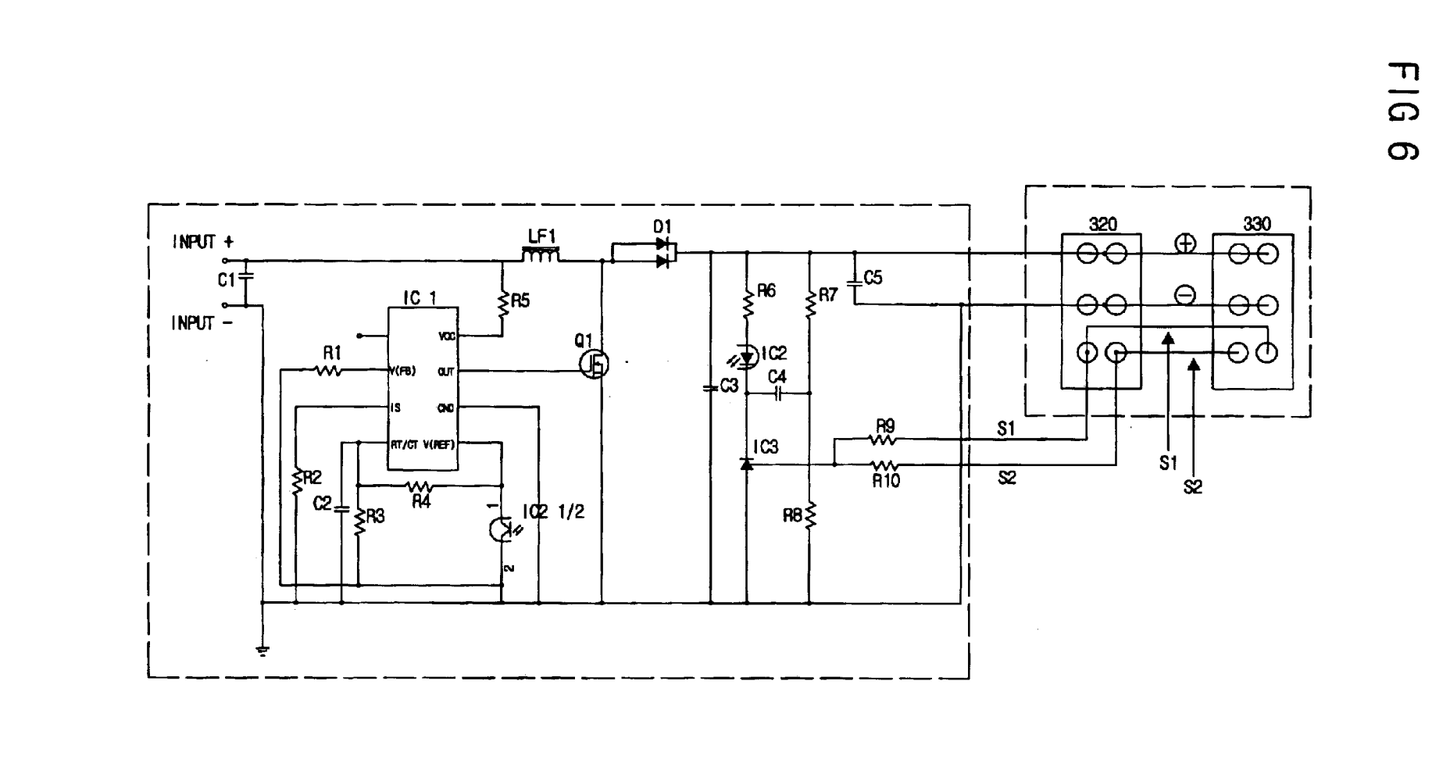
FIG. 6 is a detailed circuit diagram of an output controller in accordance with a preferred embodiment of the present invention.

FIG. 6 is a detailed circuit diagram of an output controller 21 in accordance with a preferred embodiment of the present invention. Referring to FIG. 6, an adapter detector is a feedback circuit for feeding back an output voltage by a resistor array 290 composed of R7, R8, R9 and R10 having different resistance values according to a connection status of adapter terminals. The DC/DC converter 270 contains a PWM circuit ICI controlled by the feedback signal. The feedback signal is transmitted to the DC/DC converter 270 via an optocoupler circuit IC2.

If terminals S1 and S2 are open-circuited, a voltage loaded on a light emitting part of the optocoupler IC2 is dissipated by resistors R7 and R8. Also, if the terminals S1 and S2 are short-circuited at a negative(−) terminal, a resistance loaded on the light emitting part of the optocoupler IC2 becomes a voltage dissipated between the resistor R7 and a resistance generated by a parallel connection of resistors R8, R9 and R10. If the terminals S1 and S2 are short-circuited at a positive(+) terminal, a resistance loaded on the light emitting part of the optocoupler IC2 becomes a voltage dissipated between a resistance generated by a parallel connection of resistors S7, R9 and R10 and the resistor R8. Likewise, if different resistance values are generated by a connection program of resistors R7, R8, R9 and R10, an output potential value being compared with a reference potential using this different resistance values is fed back to a PWM conversion circuit IC1 via the light emitting diode of the optocoupler IC2. That is, this feedback value is applied to an input terminal VFB for controlling a duty cycle of an output pulse of the PWM conversion circuit IC1 and an input terminal RT/CT for controlling a frequency, and then an output voltage is adjusted according to a setting status of the voltage setting terminals S1 and S2 after receiving the feedback value.

As apparent from the above description, an external battery pack apparatus according to the present invention automatically adjusts a necessary power-supply voltage on condition that a user selects an appropriate adapter according to a type of a subject electronic appliance, so that a manufacturing company can manufacture a main circuit in the same way, resulting in reduction of the production cost. Also, a marketing company only needs to label an adapter ID mark on the external battery pack apparatus, and a user freely adapts the external battery pack apparatus to his or her portable appliance as a dedicated battery by employing an appropriate adapter marked on the external battery pack apparatus.

Also, since an adapter of a cable of the external battery pack contains a simple wiring structure and a circuit is present in a main body of the external battery pack, the external battery pack has a small-sized and simplified construction.

Furthermore, since the external battery pack apparatus according to the present invention communicates with an electronic appliance via a communication port, it can support a smart communication function that has been supported by only an internal battery in the prior art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An external battery pack apparatus for supplying a power-supply voltage to a portable appliance, comprising:
   an adapter comprising a power-supply terminal and output voltage setting terminals for programming an output voltage;
   a cable connected to the adapter; and
   a main body comprising a battery, a charging controller for charging the battery, and an output controller;
   wherein the output controller performs a DC-to-DC conversion on a voltage charged in the battery and outputs the DC-to-DC converted voltage to the adapter via the cable, and the output controller includes an adapter detecting unit for generating different resistance values in response to a programming status of the terminals of the adapter, and a DC/DC converter for performing the DC to DC conversion in response to an output signal of the adapter detecting unit.

2. The external battery pack apparatus as sot forth in claim 1, wherein the adapter detecting unit comprises a resistor array for generating the different resistance values according to a connection status of the adapter terminals.

3. The external battery pack apparatus as set forth in claim 2 wherein the adapter detecting unit further comprises a feedback circuit for feeding back the output voltage of the resistor array.

4. The external battery pack apparatus as set forth in claim 1, wherein the adaptor is discriminated from a second adapter by a color code having a different color in response to a setting status of the output voltage setting terminals.

5. The external battery pack apparatus as set forth in claim 1, wherein the cable comprises a connector detachably connected to the main body.

6. The external battery pack apparatus as set forth in claim 1, further comprising:
   a central controller for checking a charging/discharging state of the battery by controlling the charging controller; and
   a communication port connected to the central controller, for transmitting the charging/discharging state information of the battery to a portable appliance.

7. The external battery pack apparatus as set forth in claim 6, wherein the communication port is integrated with the adapter.

8. The external battery pack apparatus as sot forth in claim 1, further comprising:
   a central controller for checking a charging/discharging state of the battery by controlling the charging controller; and
   a communication port connected to the central controller, for transmitting the charging/discharging state information of the battery to a portable appliance.

* * * * *